United States Patent [19]

Greenberg et al.

[11] Patent Number: 5,040,209
[45] Date of Patent: Aug. 13, 1991

[54] TELEPHONE RINGING MONITORING AND CONTROL SYSTEM

[76] Inventors: Melvin B. Greenberg, 20500 NE. 20th Pl., Miami, Fla. 33179; Donald J. Sarley, 7772 Harbor Blvd., Miramar, Fla. 33023; Andrew Adler, 1506 NE. 118th St., North Miami, Fla. 33161

[21] Appl. No.: 408,643

[22] Filed: Sep. 18, 1989

[51] Int. Cl.$^5$ .......................................... H04M 3/00
[52] U.S. Cl. ................................. 379/373; 379/387; 379/94; 379/95
[58] Field of Search ............. 379/373, 376, 387, 165, 379/94, 95

[56] References Cited

U.S. PATENT DOCUMENTS

| | | | |
|---|---|---|---|
| 4,117,270 | 9/1978 | Lesea | 379/373 X |
| 4,560,837 | 12/1985 | Carson et al. | 379/373 X |
| 4,675,899 | 6/1987 | Ahuja | 379/180 |
| 4,741,024 | 4/1988 | Del Monte et al. | 379/181 |
| 4,782,518 | 11/1988 | Mattley et al. | 379/373 X |
| 4,850,008 | 7/1989 | Berg et al. | 379/93 |
| 4,873,716 | 10/1989 | Brady | 379/165 X |
| 4,922,529 | 5/1990 | Kiel | 379/387 |

Primary Examiner—James L. Dwyer
Assistant Examiner—M. Shehata
Attorney, Agent, or Firm—Caesar, Rivise, Bernstein, Cohen & Pokotilow, Ltd.

[57] ABSTRACT

A control system for use in a conventional telecommunications system comprising a common telephone line to which plural telephones may be connected. The line is arranged to carry plural series of electrical ring-initiating signals, each for a respective one of plural telephone numbers serviced by the line. The control system comprises plural controllable ports and a controller. Each of the ports is associated with a respective one of the series of ring-initiating signals and is arranged to have a telephone and/or some auxiliary device, e.g., FAX machine, answering machine, computer, etc., connected thereto. The controller is coupled to the line and the controllable ports and detects an analyzes each of the plural ring-initiating signals on the line and also monitors the status of the line, e.g., if there is a "busy signal", an "on-hook signal", an "off-hook signal", or other signal on it. Depending upon line conditions the system controls the ports to which the telephones or other devices are connected, e.g., it precludes the first of the ring-initiating signals from reaching any port, analyzes those signals and thereafter diverts the remaining ring-initiating signals of any particular series to the associated port while continuing to preclude the remaining signals from reaching the other ports.

16 Claims, 1 Drawing Sheet

TELEPHONE RINGING MONITORING AND CONTROL SYSTEM

This invention relates generally to telecommunication systems and more particularly to telephone control system for use in application wherein plural telephone numbers are provided on the same (i.e., a common) telephone line.

BACKGROUND OF THE INVENTION

As is known the RINGMASTER SM service is an optional service provided by local telephone companies which presently allows subscribers to have up to three separate telephone numbers that will ring on each telephone line. Each number when called produces a respective ring cadence on the telephone(s) which is(are) connected to the line. This system enables the subscriber to assign a different use to each the telephone numbers so that he/she can tell who the call is for by the cadence of the telephone ring. For example, one cadence with one number can be assigned for the adults of the household, while a second number, with a different ringing cadence, can be assigned for children of the household, while a third number, with yet another different ringing cadence, can be assigned for business related calls.

With the RINGMASTER SM system the subscriber can assign one of the available number to an individual or a group of individuals for his/her/their exclusive use as a hotline. Thus, the subscriber can determine who the call is from by virtue of the ringing cadence of the phone when a call is received, i.e., when the phone rings with a particular cadence the subscriber will know that the designated individual(s) is(are) calling. The designation of a number as a hotline for use in emergencies or when a child or aged or disabled person is at home alone can be of significant importance.

The RINGMASTER SM system also offers advantages for businesses having only has a single telephone line. In such an application, the system enables one to departmentalize one's numbers with different rings for different purposes, e.g., sales calls, suppliers calls, general business inquiries, etc., to designate a number for top-priority clients, etc.

While the RINGMASTER SM system is suitable for its intended purposes, it suffers from some inherent drawbacks. For example, if more than one telephone is connected to the line, such as the case when extension telephones are utilized, all of the telephones will ring with the unique cadence as defined by the incoming call. This universal ringing action may not be desired for various applications, e.g., where the incoming call is directed to the telephone number of a child in the household whose telephone is located in his/her room so that the other telephones on that line and located elsewhere in the household do not ring.

OBJECTS OF THE INVENTION

Accordingly, it is the general object of this invention to provide a control system for a telecommunications systems which overcomes disadvantages of the prior art.

It is a further object of this invention to provide a control system to make more effective or efficient use of a telecommunication system having a common telephone line which services plural telephone numbers, each producing a respective distinctive ring on the telephone(s) connected thereto.

SUMMARY OF THE INVENTION

These and other objects of the instant invention are achieved by providing a control system for use in a conventional telecommunications system comprising a common telephone line to which plural telephones may be connected. The line is arranged to carry plural series of electrical ring-initiating signals, each series of the ring-initiating signals being for a respective one of plural telephone numbers serviced by the line and producing a respective, distinctive ringing cadence for that number by any telephone connected to the line when an incoming telephone call is directed on the line to that number. The control system comprises plural controllable ports and controller means. Each of the ports is associated with a respective one of the series of ring-initiating signals and is arranged to have a telephone and/or some device connected thereto. The controller is coupled to the line and the controllable ports and detects an analyzes each of the plural ring-initiating signals on the line while precluding the first one of each of the series of signals from reaching each of the ports and thereafter providing ring-initiating signals of the particular series associated with the telephone number of the incoming call to the associated port, and diverting said incoming call to said port, while continuing to preclude all of the ring-initiating signals of each other series from reaching the other ports and any telephone(s) or other device(s) connected thereto.

DESCRIPTION OF THE DRAWINGS

Other objects and many of the attendant advantages of this invention will be readily appreciated as the same becomes better understood by reference to the following detailed description when considered in connection with the accompanying drawing showing in schematic/block diagram form the control system of the invention.

DETAILED DESCRIPTION OF THE PREFERRED EMBODIMENT

Figure 1:
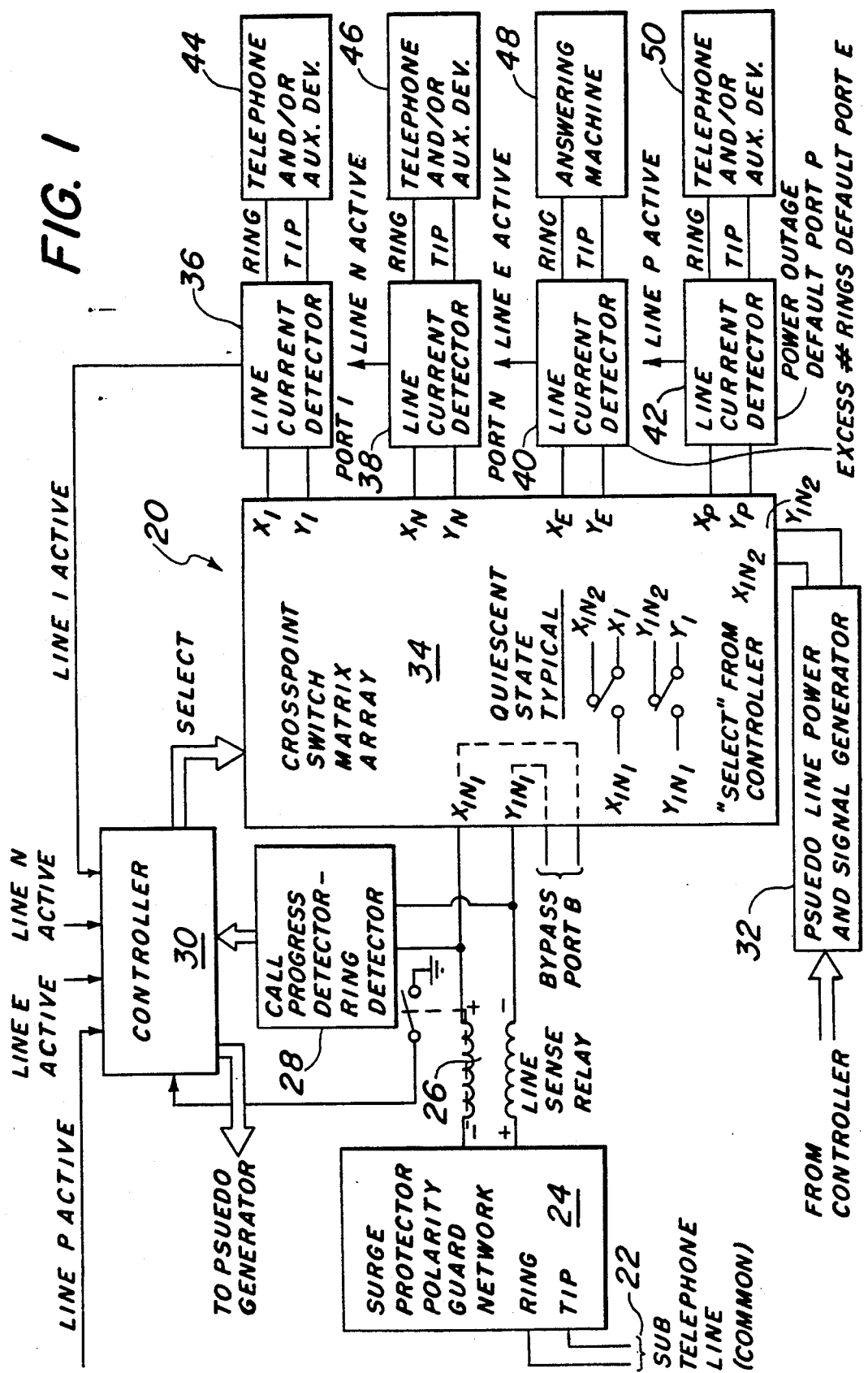

Referring now in detail to the drawing wherein like reference characters refer to like parts, there is shown at 20 in FIG. 1 a control system for use in a conventional telecommunications system (not shown) capable of providing plural telephone numbers on a single or common line 22, such as that offered by local telephone companies under the Service Mark RINGMASTER. As described above the RINGMASTER SM system provides a ring of a different codence for each telephone number called on that common line.

As will be seen hereinafter, system 20 electronically detects the telephone line ring, analyzes that ring, and diverts the ring to a specific port to which a telephone and/or other auxiliary device, such as a FAX machine, telephone answering machine, computer, etc., is connected, all without requiring the answering of that incoming call. Thus, the called party has an economical method of sharing a common line without ringing at and subsequently disturbing other parties or devices to which the incoming call is not directed. In particular, once a ring is detected, all other ports of the system are inhibited from gaining access to the common line.

Included within the system 20 is the ability to automatically connect one specific port to the telephone line in response to a power outage. This port is preferably connected to a standard telephone, unless an uninterruptable power supply is used to power a computer or FAX machine. The port to which a standard telephone is connected may be configured so as to always be connected to the line as a means for accomplishing the foregoing end. In such a case, the ringing of the phone at this port follows the signaling from the RINGMASTER SM service.

The system 20 also permits outgoing calls to be made by any device connected to any port. In particular, once a device is activated, e.g., a telephone is "off hook" (activated to make a call), the control system automatically transfers the use of the line to the device which is activated (i.e., off hook) while inhibiting all other ports of the system from gaining access to the common line until the activated device is deactivated (i.e., goes "on-hook"). The device can be activated either manually or automatically. Moreover, the system 20 can make use of an override code to be entered at the activated (off-hook) device, which code is interpreted by the system 20 as a command to allow all other devices connected to the various ports of the system to access the line. In such a case the system operates as a conventional "party line" system.

Moreover, the system 20 can utilize a specific code to be entered by the user (subscriber) to enable only one or selected ones of the ports to gain access to the line while inhibiting all other ports from gaining such access. In such a case, the specific code enables the telecommunication system to be set up for party-lining selected ports.

The system 20 is also arranged to monitor the common line status to control the various ports depending upon the monitored status. For example, an off-hook condition without dialing for a period of approximately 18 seconds results in the telephone company generating an intercept recorded message on the line to inform the party to hang-up and retry again. This message is followed by a telephone company generated signal causing the telephone to rapidly beep. The system 20 recognizes the rapid beeping tones and, in response thereto, disconnects the port to which the off-hook device is connected from the line so that the other ports may then use the line. By monitoring the line the system also recognizes when "line busy" tones are generated by the telephone company and causes the port with the device associated therewith receiving the busy signal to be disconnected from the line after a predetermined period of time. The amount of time allowed for disconnection may be extended by the system 20 so as to not interfere with automatic electronic dialing equipment which might be connected to the port at which the device attempting to make the outgoing call is located (i.e., the off-hook port) and also be analyzing the line.

As will also be described later the system 20 may optionally include the ability to retry connecting to the common line a predetermined number of times before electronically disconnecting the port which is continuously off-hook. Further still, the system may be configured to automatically reconnect the port upon detecting an on-hook status, or it may require a manual reset action from the system user.

In accordance with another feature of the system, a standard ring may be produced by a device connected to the port after the system determines the port to which the line should be diverted. The system determines when that port device goes off-hook and subsequently connects the off-hook device to the line. This feature ensures compatibility of all telephone devices with the RINGMASTER SM telecommunications system, but may not be necessary for the majority of existing telecommunication equipment.

A still further feature of the system 20 is its ability to redivert a call to one port after a predetermined number of rings. Thus, for example, an answering machine may be connected to a port to which calls are rediverted, and, hence, be shared by all ports as well as directly accessible through the RINGMASTER SM system. An auxiliary port for rediverted calls not directly accessible from an incoming call is also included so that an answering machine, 2-line call diverter, etc., can be connected to the system without the need to dedicate a telephone number to the device.

As can be seen in the drawing, the control system 20 basically comprises a surge protector/polarity guard network 24, a line sense relay 26, a call progress ring detector 28, a controller 30, a pseudo line power and signal generator 32, a cross-point switch matrix array 34, and plural line current detectors 36, 38, 40 and 42.

Each line current detector forms a port for the system to which a conventional telephone or other auxiliary communication device, such as an answering machine, facsimile (FAX) machine, computer, etc., may be connected. Thus, as used herein, the term "telephone" means a family of communication devices intended for connection to a subscriber telephone line.

In the system 2 the number of telephone numbers which may be provided on the common line 24 from the telecommunications system as represented by respective ports. Thus, for N telephone numbers there will be N ports, namely ports 1 to N (only two of which, 1 and N, are shown). In addition, the system also includes two default ports, namely, an excess number of rings default port E and a power outage default port P. Thus, as can be seen in the drawing port 1 is provided by the current line detector 36, port N by the current line detector 38, default excess ring port E by the current line detector 40, and power outage default port P by the line current detector 42.

As also can be seen in the drawing a "telephone" 44 is connected to the line detector 36 forming port 1, a "telephone" 46 is connected to the line current detector 38 forming port N, an answering machine 48 is connected to the line current detector 40 forming default port E, and a "telephone" is connected to the line current detector 42 forming the default port P. The connections between the "telephones" and their associated ports are via conventional "ring" and "tip" wires.

As is known to those skilled in the art, the central telephone office in a local area a telecommunication system distributes telephone lines signaling to its subscribers via the respective ring and tip wires (with the ring signal being traditionally negative with respective to the tip signal). Thus, the common subscriber line 22 also includes the conventional ring and tip wires. These wires serve as an input to the surge protector/polarity reversal guard network 24. That network is constructed and arranged to prevent damage to the system 20 as a result of induced surges, such as could occur from lightening or inadvertent or momentary polarity reversales of the ring and tip wires.

The output of the guard network 24 is applied to the line sense relay 26. This relay is connected to and used in conjunction with the call progress detector/ring detector 28 to analyze the conditions of the common telephone line 22. In particular, the line sense relay 26 energizes when approximately 16 milliamperes or more of current flows through the loop formed by the tip and ring wires of the telephone line 22 and a portion of the cross point matrix array 36 at one end and a central office of the telecommunication system at the other end. This current can be expected during the central office ringing process when a device is active, i.e., "off hook", such as occurs when the subscriber is communicating through his/her telephone.

The call progress/ring detector 28 serves to analyze the voltage on the loop and to provide signals indicative thereof to the controller 30. The cadence or interruption rate of this voltage is analyzed by the controller 30. In particular, in a ringing situation, that is, when a series of identical ring-initiating signals are provided on common line 22 to effectuate a particular ringing cadence, the controller 30 analyzes the first ring-initiating signal of the sequence and, as will be described hereinafter, responds by selecting the appropriate port to be switched onto the loop. The cross point switch matrix array 34 performs the switching function. To that end the signals identified by the legend "select" from the controller 30 cause the cross point matrix array to block or inhibit all of the ports from providing the first ring-initiating signal of the ringing sequence to any of the "telephones" connected to the ports. The select signals also control the operation of the array to effect control of the various system ports. To that end the control of the ports from the array 34 is effected via lines $X_1$ and $Y_1$ (for port 1), $X_N$ and $Y_N$ (for port N), $X_E$ and $Y_E$ (for port E) and $X_P$ and $Y_P$ (for port P). The line signal input to the array 34 is provided via lines $X_{IN1}$ and $Y_{IN1}$.

The call progress/ring detector 28 also serves to analyze the different frequencies of the line signals produced from the central office of the telecommunications system and which are provided on common telephone line 22. Typically, for example, the central office will generate a frequency of 480 Hz simultaneously with a frequency of 620 Hz, with an on/off cadence of 0.5 seconds/0.5 seconds and at an interruption rate of 60 times a minute, which signal is interpreted as a "line busy" signal. The central office generates a "dial tone" signal which consists of a steady combination of 350 Hz and 440 Hz.

Also connected to the cross point switch matrix array 34 via lines $X_{1N2}$ and $Y_{IN2}$ is the pseudo line power and signal generator 32. The pseudo generator 32 is connected to the controller 30 and receives control signals therefrom. In the quiescent state, the cross point switch matrix array 34 connects all output ports to the pseudo generator. The generator 32 synthesizes the subscriber telephone line so as to insure that all port-connected devices ("telephones") will function properly. When a port device is connected to the subscriber line 22, the remaining ports remain interconnected to the synthesized subscriber line and the pseudo generator 32 produces "busy signal" to these remaining ports so that any other device attempting to access the subscriber line 22 will receive the busy signal and know that the system is busy.

The current detector for each port is provided so that the controller 30 is able to detect which port connected device is active (e.g., "off-hook"). Thus, when current is detected in a particular port loop, the associated line current detectors provides a "line active signal" to the controller 30 indicating that the line is active. If the system 20 is in the quiescent state (wherein the electrical connections within the cross point matrix array 34 are like that shown in the drawing) and a device goes active (e.g., "off-hook"), the controller 30 responds to the resulting "line active" signal by switching the off hook port to the subscriber line 22 and energizing the pseudo signal generator 32 to cause it to produce a "busy signal".

If the active device does not dial within 18 seconds, a central office recording is provided by the telecommunications system to replace the dial tone to request the caller to hang up and try the call again. This action is followed by a rapid cadence of tones, also produced by the telecommunications system's central office. If the device which is "off-hook" does not disconnect, that is go "on-hook", within a predetermined period of time, the system 20 automatically disconnects the port and returns to the quiescent state. The system 20 may be configured to enable a preset number of retries to be attempted. However, if the device remains "off-hook" without dialing, the system 20 will not permit the device to access the subscriber line 22 until either a manual reset button (not shown) forming part of the system 20 is pushed, or the device goes "on-hook". Normally, the device goes "on-hook" after completion of the communication when the caller hangs up the hand set. In this case, the associated port's line current detector signals the controller 30 of this condition, which, in turn, switches that port to the pseudo generator 32 and returns the signaling of the pseudo generator to the "synthesize the subscriber line" mode (quiescent state).

The excess number of rings default port E, while connected to the matrix array 34, is not directly accessible from an incoming call on line 22. The port E is intended for use by the answering machine 40. That machine is adjusted to answer on a predetermined number of rings. Accordingly, if an incoming call is directed to any port 1 to N and that port does not answer within the predetermined number of rings, the controller redirects the incoming call to the answering machine 48 port.

A second default port is provided for protection in the event that a power outage occurs. This port is the heretofore identified power outage default port P. The controller 30 controls the matrix array 34 so that all incoming calls are routed to the port P should no power be supplied to the system 20. Alternatively, a bypass port B is provided from the array 34 via lines $X_{1N1}$ and $Y_{IN1}$ so that all incoming calls are always routed to this port. The major difference between the alternative bypass port B and the default port E is that the bypass port B will always ring the device upon receipt of an incoming call, whereas the default port P will only ring the device when no power is applied to the system 20.

Another feature of the system 20 is its ability to apply a standard ringing signal to the appropriate port regardless of the cadence of the incoming ring-initiating signal. To accomplish this, the cross point matrix array 34 isolates the target port and connects it alone to the signal generator 32 output (which produces the standard ringing cadence). Upon detection of the line active signal from the line current detector associated with the target port, the controller 30 switches the target port to the common line 22. In order to accomplish this switching, the cross point switch matrix array 34 is modified to include a two pole, three position configuration, rather than a simpler two pole, two position configuration depicted in the drawing. In addition, two additional wires, (not shown) are connected to the pseudo signal generator 32 so as to provide the standard ring-initiating signal only to the port connected to the third position of the cross point switch.

Power for the system 20 is derived directly from the subscriber line 22 or from any standard AC power (not shown). When derived from standard AC power, enough capacity is provided within the power supply such as to be able to sustain the system 20 and not cause switching action or other loss during momentary power outages.

Without further elaboration, the forgoing will so fully illustrate our invention that others may, by applying current or future knowledge, readily adopt the same for use under various conditions of service.

We claim:

1. A control system for use in a telecommunications system, said telecommunication system comprising a common telephone line to which plural telephones may be connected, said line being arranged to carry plural series of electrical ring-initiating signals, each series of said ring-initiating signals being for a respective one of plural telephone numbers serviced by said line and being arranged to produce a respective, distinctive ringing cadence for said number by any telephone connected to said line when an incoming telephone call is directed on said line to said number, said control system comprising plural controllable ports and controller means, each of said ports being associated with a respective one of said series of ring-initiating signals and being arranged to have a telephone and/or some auxiliary device connected thereto, said controller means being coupled to said line and said controllable ports and being arranged to detect and analyze each of said plural ring-initiating signals on said line while precluding the first one of each of said series of signals from reaching each of said ports and thereafter providing ring-initiating signals of the particular series associated with the telephone number of the incoming call to the associated port and diverting said incoming call to said port while continuing to preclude all of the ring-initiating signals of each series from reaching the other ports and any telephone or other device connected thereto, said controller means causing said other ports to preclude any telephone or other device connected thereto from gaining access to said line once an incoming telephone call has been diverted to said associated port.

2. A control system for use in a telecommunications system, said telecommunications system comprising a common telephone line to which plural telephones may be connected, said line being arranged to carry plural series of electrical ring-initiating signals, each series of said ring-initiating signals being for a respective one of plural telephone numbers serviced by said line and being arranged to produce a respective, distinctive ringing cadence for said number by any telephone connected to said line when an incoming telephone call is directed on said line to said number, said control system comprising plural controllable ports and controller means, each of said ports being associated with a respective one of said series of ring-initiating signals and being arranged to have a telephone and/or some auxiliary device connected thereto, said controller means being coupled to said line and said controllable ports and being arranged to detect an analyze each of said plural ring-initiating signals on said line while precluding the first one of each of said series of signals from reaching each of said ports and thereafter providing ring-initiating signals of the particular series associated with the telephone number of the incoming call to the associated port and diverting said incoming call to said port while continuing to preclude all of the ring-initiating signals of each series from reaching the other ports and any telephone or other device connected thereto, said control system also monitoring the electrical status of said line and controlling the operation of said ports in response thereto, whereupon if there is not incoming telephone call on said line any telephone or device connected to any of said ports may gain access to said line, whereupon when said telephone or device is activated to make an outgoing call an off-hook signal is produced, said control system operating in response to said off-hook signal to cause said other ports to preclude any telephone or other device connected thereto from gaining access to said line until an on-hook signal or an over-ride signal is detected.

3. The control system of claim 2 wherein said on-hook signal is provided automatically upon the completion of said outgoing telephone call.

4. The control system of claim 2 wherein said on-hook signal is provided manually.

5. The control system of claim 2 wherein said over-ride signal is produced at the telephone or device making the outgoing telephone call.

6. The control system of claim 5 wherein said over-ride signal is selectable to enable one or more of said telephones or devices to gain access to said line, whereupon said line acts as a party line.

7. The control system of claim 1 wherein when there is no incoming telephone call on said line any telephone or device connected to any of said ports may gain access to said line, whereupon said control system causes said other ports to preclude any telephone or other device connected thereto from gaining access to said line.

8. The control system of claim 1 wherein said system monitors the electrical status of said line and controls the operation of said ports in response thereto, whereupon if an electrical signal is provided on said line from said telecommunications system indicating that one of said telephones has been been off hook for a predetermined period of time without dialing said control system detects said condition and causes the port to which said one telephone is connected to be disconnected from said line so that any other telephone or device connected to any other port can gain access to said line for effecting an outgoing telephone call or receiving an incoming telephone call.

9. The control system of claim 1 wherein said system monitors the electrical status of said line and controls the operation of said ports in response thereto, whereupon if an electrical signal is provided on said line from said telecommunications system indicating that one of said telephones has been been off hook for a predetermined period of time without dialing said control system detects said condition and causes the port to which said one telephone is connected to be disconnected from said line so that any other telephone or device connected to any other port can gain access to said line for effecting an outgoing telephone call or receiving an incoming telephone call.

10. The control system of claim 2 wherein said system monitors the electrical status of said line and controls the operation of said ports in response thereto, whereupon if an electrical signal is provided on said line from said telecommunications system indicating that one of said telephones has been been off hook for a predetermined period of time without dialing said control system detects said condition and causes the port to which said one telephone is connected to be disconnected from said line so that any other telephone or device connected to any other port can gain access to said line for effecting an outgoing telephone call or receiving an incoming telephone call.

11. A control system for use in a telecommunications system, said telecommunications system comprising a common telephone line to which plural telephones may be connected, said line being arranged to carry plural series of electrical ring-initiating signals, each series of said ring-initiating signals being for a respective one of plural telephone numbers serviced by said line and being arranged to produce a respective, distinctive ringing cadence for said number by any telephone connected to said line when an incoming telephone call is directed on said line to said number, said control system comprising plural controllable ports and controller means, each of said ports being associated with a respective one of said series of ring-initiating signals and being arranged to have a telephone and/or some auxiliary device connected thereto, said controller means being coupled to said line and said controllable ports and being arranged to detect an analyze each of said plural ring-initiating signals on said line while precluding the first one of each of said series of signals from reaching each of said ports and thereafter providing ring-initiating signals of the particular series associated with the telephone number of the incoming call to the associated port and diverting said incoming call to said port while continuing to preclude all of the ring-initiating signals of each series from reaching the other ports and any telephone or other device connected thereto, said control system also monitoring the electrical status of said line and controlling the operation of said ports in response thereto, whereupon if any telephone or device connected to any port attempts to make an outgoing telephone call and an electrical busy signal is provided on said line from said telecommunications system said control system detects said condition and causes the port to which telephone is connected to be disconnected from said line after a predetermined period of time so that any other telephone or device connected to any other port can gain access to said line for effecting an outgoing telephone call or receiving an incoming telephone call.

12. The control system of claim 1 wherein said system monitors the electrical status of said line and controls the operation of said ports in response thereto, whereupon if any telephone or device connected to any port attempts to make an outgoing telephone call and an electrical busy signal is provided on said line from said telecommunications system said control system detects said condition and causes the port to which telephone is connected to be disconnected from said line after a predetermined period of time so that any other telephone or device connected to any other port can gain access to said line for effecting an outgoing telephone call or receiving an incoming telephone call.

13. The control system of claim 2 wherein said system monitors the electrical status of said line and controls the operation of said ports in response thereto, whereupon if any telephone or device connected to any port attempts to make an outgoing telephone call and an electrical busy signal is provided on said line from said telecommunications system said control system detects said condition and causes the port to which telephone is connected to be disconnected from said line after a predetermined period of time so that any other telephone or device connected to any other port can gain access to said line for effecting an outgoing telephone call or receiving an incoming telephone call.

14. The control system of claim 8 wherein said system monitors the electrical status of said line and controls the operation of said ports in response thereto, whereupon if any telephone or device connected to any port attempts to make an outgoing telephone call and an electrical busy signal is provided on said line from said telecommunications system said control system detects said condition and causes the port to which telephone is connected to be disconnected from said line after a predetermined period of time so that any other telephone or device connected to any other port can gain access to said line for effecting an outgoing telephone call or receiving an incoming telephone call.

15. A control system for use in a telecommunications system, said telecommunications system comprising a common telephone line to which plural telephones may be connected, said line being arranged to carry plural series of electrical ring-initiating signals, each series of said ring-initiating signals being for a respective one of plural telephone numbers serviced by said line and being arranged to produce a respective, distinctive ringing cadence for said number by any telephone connected to said line when an incoming telephone call is directed on said line to said number, said control system comprising plural controllable ports and controller means, each of said ports being associated with a respective one of said series of ring-initiating signals and being arranged to have a a telephone and/or some auxiliary device connected thereto, said controller means being coupled to said line and said controllable ports and being arranged to detect an analyze each of said plural ring-initiating signals on said line while precluding the first one of each of said series of signals from reaching each of said ports and thereafter providing ring-initiating signals of the particular series associated with the telephone number of the incoming call to the associated port and diverting said incoming call to said port while continuing to preclude all of the ring-initiating signals of each series from reaching the other ports and any telephone or other device connected thereto, said controller means provides a signal to the associated port to which said ring-initiated signals would be diverted to cause a conventional ringing signal to be produced by the telephone connected thereto.

16. The control system of claim 1 wherein said control means provides a signal to the associated port to which said ring-initiated signals would be diverted to cause a conventional ringing signal to be produced by the telephone connected thereto.

* * * * *